(12) United States Patent
Noldus et al.

(10) Patent No.: US 9,020,113 B2
(45) Date of Patent: Apr. 28, 2015

(54) METHOD OF AND A SERVER FOR ESTABLISHING COMMUNICATION IN A TELECOMMUNICATION SYSTEM WHEREIN CALLING PARTY IDENTITY IS WITHHELD

(75) Inventors: Rogier August Caspar Joseph Noldus, Goirle (NL); Jos Den Hartog, Capelle a/d Ijssel (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/112,120

(22) PCT Filed: Apr. 20, 2011

(86) PCT No.: PCT/EP2011/056385
§ 371 (c)(1),
(2), (4) Date: Jan. 14, 2014

(87) PCT Pub. No.: WO2012/143052
PCT Pub. Date: Oct. 26, 2012

(65) Prior Publication Data
US 2014/0146954 A1    May 29, 2014

(51) Int. Cl.
*H04M 15/00* (2006.01)
*H04M 15/06* (2006.01)
(Continued)

(52) U.S. Cl.
CPC ............ *H04M 15/10* (2013.01); *H04L 61/1529* (2013.01); *H04L 61/2539* (2013.01);
(Continued)

(58) Field of Classification Search
CPC ............ H04L 12/5885; H04L 63/0407; H04L 63/0428; H04M 3/42008; H04M 3/42025; H04M 3/48; H04M 15/00; H04M 3/42195; H04M 3/42059; H04W 12/02; H04W 76/007

USPC ........ 379/88.19, 88.21, 93.17, 93.23, 102.07, 379/114.01, 122, 127.01, 130, 210.01, 379/210.03, 114.05, 114.26, 118, 127.03, 379/127.06, 142.02, 142.03
See application file for complete search history.

(56) References Cited

U.S. PATENT DOCUMENTS 4,847,890 A * 7/1989 Solomon et al. ............ 379/88.21
5,661,790 A * 8/1997 Hsu ........................... 379/209.01
(Continued)

FOREIGN PATENT DOCUMENTS

EP          1748634 A2     1/2007
WO      2011001420 A1     1/2011

OTHER PUBLICATIONS

Lilley, Stephen. "How to Call Back an Unlisted Telephone Number." eHow.com. Available at http://www.ehow.com/how_5124982_call-back-unlisted-telephone-number.html.
Unknown, Author. "Additional Calling Features." Interstate Telecommunications Cooperative, Inc. Available at http://itc-web.com/services-and-products/phone/calling-features/additional-calling-features/.

*Primary Examiner* — Binh Tieu
(74) *Attorney, Agent, or Firm* — Murphy, Bilak & Homiller, PLLC

(57) ABSTRACT

A method (10) of and a server (60) and telecommunication system (30) for establishing communication (11) from a first party (31) having a first party identity to a second party (32) having a second party identity, wherein said first party identity is withheld for said second party (32). A token or correlation identifier (67) unique for the communication is generated (15), and the token or correlation identifier (67) is associated (16) with the first party identity for establishing a further communication in the telecommunication system (30) between the first party (31) and the second party Calling party (32) based on this token or correlation identifier (67).

14 Claims, 3 Drawing Sheets

(51) Int. Cl.
  *H04M 1/56* (2006.01)
  *H04M 15/10* (2006.01)
  *H04M 3/42* (2006.01)
  *H04L 29/06* (2006.01)
  *H04L 29/12* (2006.01)

(52) U.S. Cl.
  CPC ....... *H04L61/3085* (2013.01); *H04M 3/42008* (2013.01); *H04M 3/42042* (2013.01); *H04M 3/42059* (2013.01); *H04M 3/42195* (2013.01); *H04M 15/745* (2013.01); *H04M 2203/6009* (2013.01); *H04M 2215/0108* (2013.01); *H04L 65/1006* (2013.01); *H04L 65/1016* (2013.01); *H04L 65/1069* (2013.01); *H04L 65/1096* (2013.01)

(56) References Cited

U.S. PATENT DOCUMENTS

| | | | | |
|---|---|---|---|---|
| 5,689,548 | A * | 11/1997 | Maupin et al. | 455/404.1 |
| 5,901,209 | A * | 5/1999 | Tannenbaum et al. | 379/142.09 |
| 6,311,164 | B1 * | 10/2001 | Ogden | 705/7.14 |
| 6,493,443 | B1 * | 12/2002 | Furman et al. | 379/210.01 |
| 6,741,691 | B1 * | 5/2004 | Ritter et al. | 379/210.01 |
| 8,325,897 | B1 * | 12/2012 | McClintock et al. | 379/210.01 |
| 8,442,479 | B2 * | 5/2013 | Bakker et al. | 455/404.1 |
| 2004/0192252 | A1 * | 9/2004 | Aerrabotu et al. | 455/404.1 |
| 2005/0032546 | A1 | 2/2005 | Kehr | |
| 2007/0211867 | A1 * | 9/2007 | Polk et al. | 379/45 |
| 2009/0131022 | A1 * | 5/2009 | Buckley et al. | 455/412.1 |

* cited by examiner

METHOD OF AND A SERVER FOR ESTABLISHING COMMUNICATION IN A TELECOMMUNICATION SYSTEM WHEREIN CALLING PARTY IDENTITY IS WITHHELD

TECHNICAL FIELD

The present invention generally relates to telecommunications and, more specifically, to establishing communication in a telecommunication system between a first party having a first party identity and a second party having a second party identity, wherein the identity of the first party identity is withheld for the second party.

BACKGROUND

Present telecommunication systems such as the Public Switched Telephone Network, PSTN, the Integrated Services Digital Network, ISDN, mobile telecommunication systems and Internet Protocol, IP, communication systems like the Internet protocol Multimedia Subsystem, IMS, and Voice over IP, VoIP, systems provide a service to a called or receiving party for identifying a calling or originating party on the basis of a directory number or Calling Line Identity, CLI.

With this service, during set up of a communication by a calling party, an identity of the calling party, such as his/her user or subscriber number, is transmitted towards the User Equipment, UE, of the called party. The called party receives an indication on the display of his/her UE about the identity of the calling party, such as the user or subscriber number or other information associated with a user or subscriber number and stored in a memory of the UE, such as the name of the calling party, for example.

However, in some cases, users do not wish to be identified, for example unlisted users having their subscriber number not listed in public phone directories or the like. To that end, a service called Calling Line Identification Restriction, CLIR, is available in the telecommunication systems. With this service the identity of a calling party is withheld from a called party, such that the called party will not receive information concerning the identity of a calling party. With CLIR enabled, a server or node of the telecommunication network indicates the restriction of the calling party identity towards a further node of the telecommunication network by including a privacy flag in the signalling information when establishing communication. As a result of this flag, the calling party identity is suppressed and not displayed on the UE of the called party, such that the calling party remains anonymous to the called party.

A selected and restricted group of users comprising emergency services, police and law enforcement agencies and the like may be authorised to use a service called CLIR-override. With CLIR-override the calling party identity can be retrieved to the called party, even if CLIR is enabled for the calling party. This service, however, is not generally available for users or subscribers of a telecommunication system but only through special permission.

In general, when CLIR is enabled, the calling party may not want to be called back or be reachable on a public number. However, in some cases it would be desirable to call back, for example when a call is dropped or when the called party needs to contact the calling party. Another situation in which call back would be desirable is the case in which the called party has missed the call, i.e. a no answer condition.

In practice there is a service available for calling back user or subscriber numbers, wherein dialling a particular string, such as *69, by a called party, results in calling back, by the telecommunication system, of the calling party involved with the most recent call, even when the CLI of that party is restricted.

A service called Automatic Recall, which is an implementation of the ISDN standard, is built around the same principle. With Automatic Recall a called party can retrieve the user or subscriber number of the calling party of the last call received by the called party as well as a time stamp of that call. The service also provides the called party the choice of calling back on this most recent call. However, when a privacy flag such as CLIR is enabled for the calling party, the identity of the calling party is withheld for the called party. Despite that, the Automatic Recall service is capable of re-establishing the communication between the called party and the calling party of the most recent incoming call.

These prior art services, however, have several drawbacks, in that they only allow for calling back the last or most recent, incoming call. For example, if between receiving a call from a party calling with a withheld identity and the time of calling back that party the called party is faced with an additional incoming call, the possibility of calling back the called party with the withheld identity is lost.

Further, there is no possibility of establishing communication with an anonymous calling party from a communication device other than the UE that received a call from the anonymous calling party. Other forms of communication may, likewise, not be possible such as sending an e-mail or text or multimedia message when receiving a telephone call of a calling party with a withheld identity, for example.

SUMMARY

It is an object to provide an improved method of establishing communication in a telecommunication system between a first party having a first party identity and a second party having a second party identity, wherein the identity of the first party identity is withheld for the second party.

It is another object to provide a server for use in a telecommunications system supporting the improved method.

It is a further object to provide a telecommunication system comprising at least one server supporting the improved method.

In a first aspect of the invention there is provided a method in a telecommunication system of establishing communication from a first party having a first party identity to a second party having a second party identity, wherein the first party identity is withheld for the second party. The method comprises the steps of:
  generating a token unique for the communication, and
  associating the token with the first party identity for establishing a further communication in the telecommunication system between the first party and the second party based on the token.

With the improved method, for a communication from an anonymous party, such as a user or subscriber the identity of which is withheld for a called party, for example in that CLIR is enabled, i.e. the calling anonymous first party, when setting up a communication or call to a called party, i.e. the called second party, the telecommunication system generates a token or correlation identifier unique to the communication. The generated token is assigned or associated by the telecommunication system to the calling, anonymous, first party identity.

The purpose of the association or assignment is such that from this token the telecommunication system can identify the anonymous first party and can set up a further communication with the anonymous first party addressed by the respective token.

That is, based on the token or correlation identifier, the second party may address the first party in the telecommunication system for establishing a further communication with the anonymous first party without knowing the true identity of the first party. Accordingly, the first party remains anonymous.

Different from prior art, wherein only the calling party of the most recent call or communication can be retrieved, the token provides the possibility of establishing a further communication with the anonymous party as long as the token is available and validly assigned to or associated with the anonymous party. Thus independent of any intermediate calls received or initiated by the second party.

The fact that the token is unique for each communication in the telecommunication network, reduces the risk that for a particular anonymous party each time a same token will be generated, which effectively would render the party not anonymous anymore.

Instead of associating the token solely with the anonymous first party, the associating step of the method, in a further example thereof, comprises associating the token with the first party identity and the second party identity.

With this example, based on a token that is also associated with or assigned to the identity of the second party, the anonymous first party may establish a further communication with the second party without the need of generating a new token or a new correlation identifier. From the fact that the token is not changed, the second party receives an indication that the further communication is initiated by the same calling party of the communication for which the token originally has been generated.

Receiving multiple calls with a same token may inform the called party of the fact that someone is eagerly trying to get in contact, for example. If for each communication a new token was generated, the second party would not recognise the further communication as a being a call from a same first party.

In another example, the token or correlation identifier is temporarily associated with the first party identity. That is, there is a limit amount in time during which communication can be established with the anonymous first party based on the token. With this time limit, the anonymity of the first party is even better protected. Without such a time limit, it would always be possible for the called party to establish a communication with the second party under the same token. The second party could over time recognise the token and therefore the identity of the first party. Setting a time limit to the validity of the association of the token with a particular anonymous calling party prevents this.

By this temporary assignment the token or correlation identifier becomes reusable, such that only a limit amount of tokens or correlation identifiers needs to be available in the telecommunication system. In fact an amount enough for a maximum expected number of simultaneous anonymous communications during the validity time limit. In the case the token or correlation identifier is made up as a numeric value, the validity time limit reduces the string of numerals to dial and/or to remember by the party that uses the token to set up a further communication. Generally speaking, the length of the token may be kept limited, which is considered user friendly towards the parties involved and beneficial for the amount of and processing capacity of the resources used to execute the method in the telecommunication system.

For a like reason, in another example, the token is temporarily associated with the second party identity.

In the case of an anonymous second party, the method further provides that the identity of the second party is withheld for the first party. That is, if the called second party is anonymous too, i.e. the CLIR service is enabled for this party or a privacy flag or the like is set, the identity of the called second party is withheld for the calling party. When setting up a further communication by an anonymous second party, using a token or correlation identifier, as described above, no new token will be generated either. By having the token also associated with the second party identity, the first party is able to set up a further communication to an anonymous second party.

There are several examples of making the token or correlation identifier known to one or all parties involved in a communication from a first party having a first party identity to a second party having a second party identity, wherein the first party identity is withheld for the second party.

In one example, the token is displayed to the second party. That is, the token or correlation identifier is directly displayed on a display of the UE used by the called second party to answer a call, for example.

In another example, the token is also displayed to the first party. That is, the token or correlation identifier is directly displayed on a display of the UE used by the calling first party to establish a communication.

The display may be available or shown, for example, as long as the association of the token or correlation identifier with a particular anonymous communication remains valid or for a fixed period of time of 10 minutes, one hour or one day only.

The token or correlation identifier may be exchanged with the called second party by replacing, in the relevant signalling information provided to the UE of the called second user, the identity of the calling first party by an indication that the calling party is anonymous, such as 'anonymous', 'private', 'withheld', together with the respective token, for example in the form of a string of numerals, characters, symbols or a combination thereof. By displaying information that a call is received from an anonymous calling party and the token, the called user may decide to answer the call directly or to use the token for calling back at a later point in time.

In a further example, the method comprises the step of logging the communication and token in a call log, and to establish the further communication from the call log.

Most current UEs are capable of displaying a call log to provide the user of the UE a list of calls, whether or not outgoing or incoming answered or missed calls, for example. Incorporating the token or correlation identifier in such a call log enables the user to select, from the call log list on his or her UE, a particular anonymous call and corresponding token, to call back the anonymous calling party for establishing the further communication. Likewise, if the token is associated with a called second party, the calling anonymous party may set up a further communication from the call log list on his/her UE.

It will be appreciated that instead of associating a communication of an anonymous party directly with the identity of the calling and/or called party in the telecommunication system, the improved method may also operate with an indirect association of the token with a record of the initial or originating communication held by the telecommunication system and, for example, identified by a unique record identifier. That is, a call record at least holding information of the calling party identity and the called party identity. The token may be associated with or assigned to such call record identifier or other information leading to the record at least holding the first party identity of the initial communication.

Those skilled in the art may identify other manners for associating the token with information of the telecommunication network at least resulting in resolving the first party identity of the initial communication, which manners are regarded within the scope of the improved method.

Instead of or in addition to logging calls on a particular UE, telecommunication systems may provide registered users or subscribers of the system a network based call log. Network based call logs provide users a central stored call log from which a user can access and select call information. It will be appreciated that what is disclosed above with respect to a call log on a UE is equally valid for a network based call log, with an additional advantage that the network based call log is available to a user independent of a particular UE, such that a user can use multiple UEs for accessing the call log and establishing the further communication by selecting a call from the network based call log.

In another aspect the method further comprises the step of providing tariff information for the further communication based on the token.

When a party intends to establish a further communication, he or she is not aware of the costs involved. This, because different from a regular telephone number, the token may not provide information from which the type of the further communication can be deducted, such as a local call, long distant call, an international call, a mobile call, or the like. However, by providing tariff information with the token, or when a token has been selected for setting up a further communication or in a call log, for example, the called party can decide whether or not to establish the further communication to the calling party on the basis of the tariff information.

An alternative for the unknown tariff levels is applying a fixed charge for calling back to an anonymous party in a further communication. These fixed charges can be applied, with a same or different rate, for all those calls or for types of calls such as local, long distance, international, mobile and other types of calls.

In a further aspect the communication and the further communication comprises any one or more of the group at least comprising a telephone communication, an email communication, a video communication and a text communication.

Note that with the improved method the user can decide whether to follow up an anonymous call using another type of communication than the type of the received call. For example, the received anonymous call is a telephone call, the called party may decide to answer or to set up a further communication using video or e-mail, for example.

In a second aspect of the invention a server is provided for operating in a telecommunication system arranged for establishing communication from a first party having a first party identity to a second party having a second party identity, wherein the first party identity is withheld for the second party. The server comprises a token generating unit, for generating a token unique for the communication, and a token associating unit for associating the token with at least one of the first party identity and, the first party identity and the second party identity, for establishing a further communication in the telecommunication system between the first party and the second party based on the token, in accordance with the method disclosed above.

More specifically, the server is arranged to operate as an application services server for operating in an Internet protocol Multimedia Subsystem, IMS, telecommunication system.

In a third aspect of the invention a telecommunication system is provided, comprising a plurality of servers arranged for establishing communication from a first party having a first party identity to a second party having a second party identity, wherein the first party identity is withheld for the second party, wherein at least one server having:
  a token generating unit, for generating a token unique for the communication, and
  a token associating unit for associating the token with at least one of the first party identity and, the first party identity and the second party identity, for establishing a further communication in the telecommunication system between the first party and the second party based on the token, in accordance with the method disclosed above.

It is to be noted that the improved method is likewise applicable in a communication from a single anonymous party to multiple called parties. In such a case, in the present description and claims, the term called second party is to be construed as comprising multiple called second parties.

The above-mentioned and other features and advantages of the invention will be best understood from the following description referring to the attached drawings. In the drawings, like reference numerals denote identical parts or parts performing an identical or comparable function or operation.

Although the examples presented in the drawings specifically relate to an IMS communications network and system, using Session Initiation Protocol, SIP, signalling, the above disclosed improved method, server and telecommunications system are not to be construed as limited to IMS or SIP services. To the contrary, the invention may be applied in any telecommunications system such as a Public Switched Telephone Network, PSTN, an Integrated Services Digital Network, ISDN, mobile telecommunication systems and Internet Protocol, IP, communication systems such as Voice over IP, VoIP, systems, and combinations thereof, which systems are all construed to be included in the term telecommunication system as used in the present description and claims.

DETAILED DESCRIPTION

Figure 1:
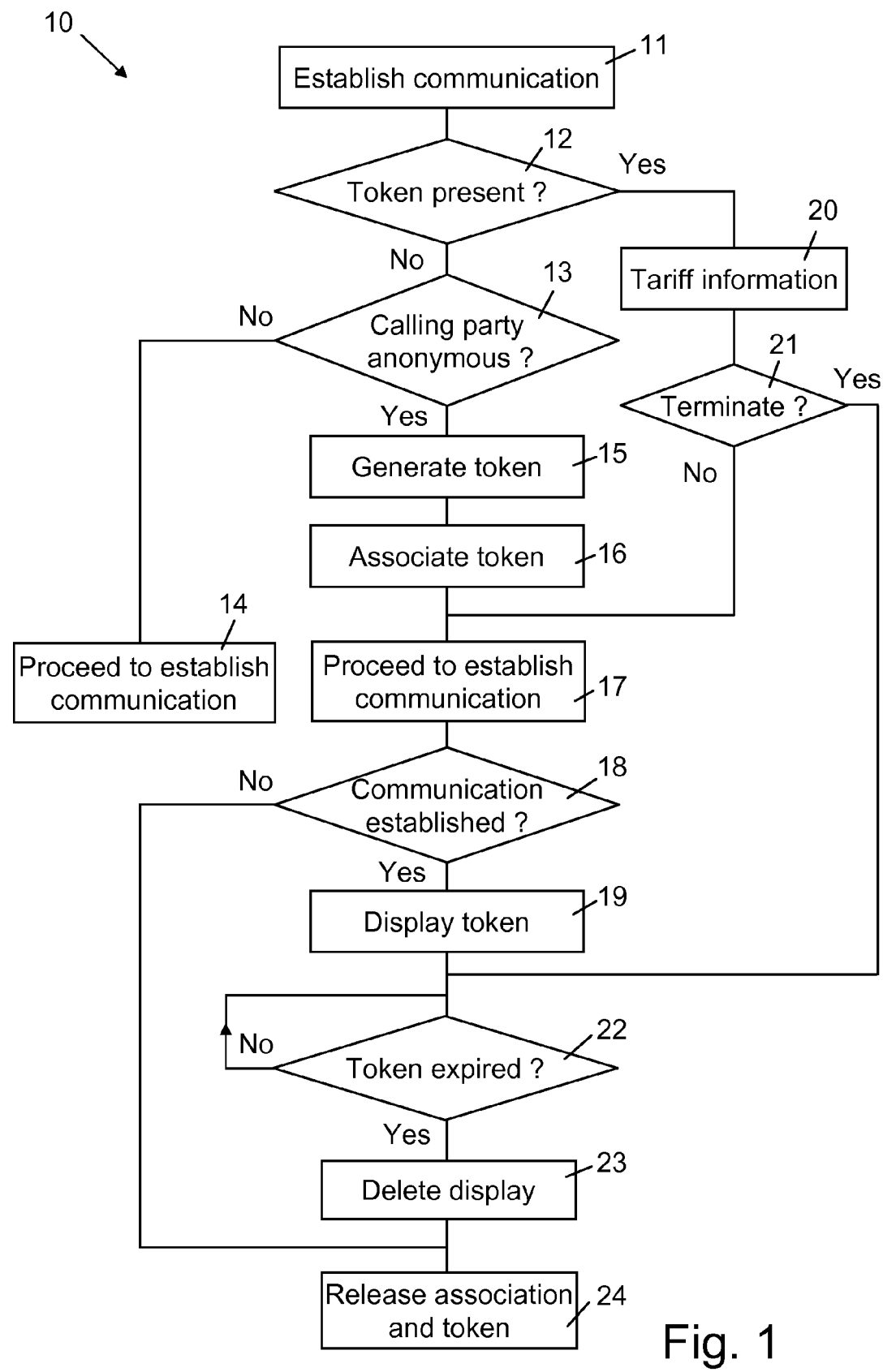
FIG. 1 shows a flowchart illustrating the improved method in a first aspect of the invention.

The flowchart of FIG. 1, generally designated by reference numeral 10, schematically illustrates the improved method according to a first aspect of the invention in a telecommunication system. The flow chart is to be read in the direction of flow from top to bottom. Other flow directions are indicated by a respective arrow.

The first step in the improved method of flowchart 10 is establishing, in the telecommunication system, of a communication from a calling or originating first party to a called or receiving second party, indicated by block 11 "Establish communication".

In a next step, the telecommunication system determines whether the second party is addressed by its identity in the telecommunication system, for example a subscriber or telephone number, an e-mail address, an IP address or any other type of identifier by which a party can be identified in the telecommunication system, or by a token or correlation identifier according to the invention, indicated by decision block 12 "Token present?".

Assume that the called second party is addressed by its second party identity in the telecommunication system, i.e. outcome "No" of decision block 12.

The telecommunication system then establishes whether the identity of the calling first party has to be withheld, i.e. an anonymous calling first party, indicated by decision block 13 "Calling party anonymous?". Such as check may include, for example, whether a Calling Line Identification Restriction, CLIR, service is enabled for that party or a privacy flag is set in the signalling information when establishing communication, or the like.

In the negative, i.e. outcome "No" of block 13 or in the case CLIR and CLIR-override apply for the call, the communication can be established according to the rules and procedures of the telecommunication system, as will be appreciated by the skilled person, i.e. indicated by block 14 "Proceed to establish communication".

In the affirmative, i.e. outcome "Yes" of decision block 13, the telecommunication system first may check whether one or both of the calling and called party is registered for performing the improved method according to the invention. That is, the improved method may be provided as a service of the telecommunication system, for example on a subscription basis or the like. This check may be performed in a separate decision block or integrated in decision block 13, for example.

Assuming that the improved method is to be applied, the telecommunication system generates a token or correlation identifier unique for the communication to be established, block 15 "Generate token". Examples of such a token or correlation identifier are 'anonymous 367', 'private 367', 'withheld 2129', "#367\* or the like, wherein the numerals are unique to the particular communications.

The way the token is expressed depends on the arrangement of the nodes or servers and protocols implemented in the telecommunication system, the ability of the User Equipment, UE, in displaying and processing strings, character sequences, symbols, and the like. Furthermore, the length of a token, i.e. the number of characters, numerals, symbols and the like determines the number of communications for which a unique token can be generated.

The token may be generated by a software and/or hardware implemented token generator by uniquely calculating the token or looking-up same from a table or database holding multiple available tokens, for example. In each case, the token can be provided by a token generating unit provided in the telecommunication system.

Once generated, the token or correlation identifier is associated with or assigned to the calling first party identity or both the calling first party identity and the called second party identity, indicated by block 16 "Associate token". The effect of this association or assignment is that the respective party can be identified in the telecommunication system by the token or correlation identifier for setting up a further communication to the particular party by the other party involved in the original communication that has led to the generation of the token or correlation identifier. Or in other words, the token or correlation identifier serves the purpose of translating same back to the telephone number or other identity used in the telecommunication system to address a party or subscriber or user.

The manner by which the association is effected may depend on the protocols, signalling and storage resources of the particular telecommunication system, as will be appreciated by those skilled in the art. In each case the method can be performed by a token associating unit that associates the token with at least one of the calling first party identity and, the calling first party identity and the called second party identity for establishing a further communication in the telecommunication system between the first party and the second party based on the token. The token may furthermore be associated with a call of the communication in the telecommunication system, also called call detail record. Thereby the token can be used to, in an indirect way, lookup the identity of a party from the call detail record. If all calls hold unique call detail records the call detail record itself could be associated with the token in order for the service according to the improved method to operate.

Next, the establishment of the communication or call setup may proceed according to the rules and protocols of the particular telecommunication system, indicated by block 17 "Proceed to establish communication", in which the true identity of the anonymous party is withheld to the other party at each time.

Note that in the present description and claims a communication or call is regarded as being established when an indication has been provided to the called party that the calling party wishes to contact the called party, for example through a signalling connection established between the UEs of the parties involved. The communication or call must not necessarily have been answered by the called party in that content information like speech, video or other audio data or text messages or the like is exchanged, i.e. a missed call or communication.

The token or correlation identifier is only available for the parties involved in the communication for which the token or correlation identifier is uniquely generated. For a single communication one token or correlation identifier is sufficient and this token or correlation identifier can be known beforehand by the parties. For multiple communications multiple tokens or correlation identifiers need to be available, such that a particular token or correlation identifier has to be made available to one or all parties involved in a particular communication.

If the communication is established, that is outcome "Yes" of decision block 18 "Communication established?", the token or correlation identifier is anyhow displayed to the called second party and may be also displayed to the calling first party, if applicable, i.e. block 19 "Display token". This could be achieved by signalling the token in the To header in a 200 Ok message towards the calling party.

If no communication is established, that is when no connection at all is possible, for example when the dialled telephone number does not exist or the like, outcome "No" of decision block 19, the association and the generated token or correlation identifier may be released and the token or correlation identifier is again available for other communications in the telecommunication system. Such as indicated by block 24 "Release association and token".

If a calling party, such as the previously called second party or the calling first party, likes to establish a further communication with the other party of the previous communication based on a token or correlation identifier generated in the accordance with the improved method, the outcome of decision block 12 "Token present?" will be "Yes" and no new token will be generated. This has the advantage that the called party, from the displayed token or correlation identifier, can discover that this communication is a further communication in return to or in continuation of an initial communication that has generated the token or correlation identifier. If the initial call dropped, for example, and the called second party calls back the originally calling first party, the first party is able to see that the call is arriving from the same second party as previously called, assumed that the token or correlation identifier is displayed to the first party.

To provide a calling party, using a token or correlation identifier, information about the costs of a further communication before same is established, block 20 "Tariff information" is provided, for example displayed at a display of a UE. This tariff information may be based on the token or correlation identifier if, for example, the token or correlation identifier is selected from tokens dedicated to a particular one of multiple ranges each relating to a particular call charging, such as local, long distance, international, mobile and other types of call rates and rate calculation methods. However, because the token or correlation identifier is related to one or both of the first party identity and the second party identity, the costs of the further communication can also be calculated based on these identities.

The calling party may decide, based on the tariff information provided, whether or not continue the further communication, for example, i.e. decision block 21 "Terminate?". If "No", the method proceeds and the setting up of the further communication is continued, based on the token or correlation identifier.

The communication will be addressed using the calling party identity retrieved from the identity information associated with the particular token or correlation identifier, and the communication may proceed to establishment thereof in accordance with the procedures, rules and protocols of the telecommunication system, block 17 "Proceed to establish communication".

The step of displaying a token, i.e. block 29, may involve logging thereof in call log available for users of the telecommunication system. Most current UEs are capable of displaying a call log to provide the user of the UE a list of calls, whether or not outgoing or incoming answered or missed calls, for example. Incorporating the token or correlation identifier in such a call log enables the user to select, from the call log list on his or her UE, a particular anonymous call and corresponding token, to call back the anonymous calling party for establishing the further communication. Likewise, if the token is associated with a called second party, the calling anonymous party may set up a further communication from the call log list on his/her UE.

Instead of or in addition to displaying and logging calls on a particular UE, telecommunication systems may provide registered users or subscribers of the system a network based call log. Network based call logs provide users a central stored call log from which a user can access and select call information. It will be appreciated that what is disclosed above with respect to a call log on a UE is equally valid for a network based call log, with an additional advantage that the network based call log is available to a user independent of a particular UE, such that a user can use multiple UEs for accessing the call log and establishing the further communication by selecting a call from the network based call log. Accordingly, block 19 may also involve logging of the token in a network based call log.

Once a token has been associated with a communication and is displayed, if applicable, the validity thereof may be monitored in an embodiment of the improved method in which the token is temporarily associated with a communication and party identities. For example for 10 minutes or one hour or one day only, in order not to breach the confidentiality of a party. This is represented in FIG. 1 by decision block 22 "Token expired". If the result of the decision is "Yes", than the association will be released and the display including a call log, if applicable, thereof will be deleted and the token or correlation identifier will become available for a new communication, block 23 "Delete display" and block 24 "Release association and token".

If a calling party, in decision block 21, decides to terminate the further communication based on the tariff information provided, i.e. outcome "Yes", the further communication will terminated, however the association of the token or correlation identifier may be kept in force, till the token or correlation identifier expires, for example, i.e. block 22.

Those skilled in the art will appreciate that the sequence of some steps in the flowchart 10, without having to apply inventive skills, may be interchanged or executed at a different point in the flow. All these changes are, of course, regarded to be included in the scope of the present improved method.

Figure 2:
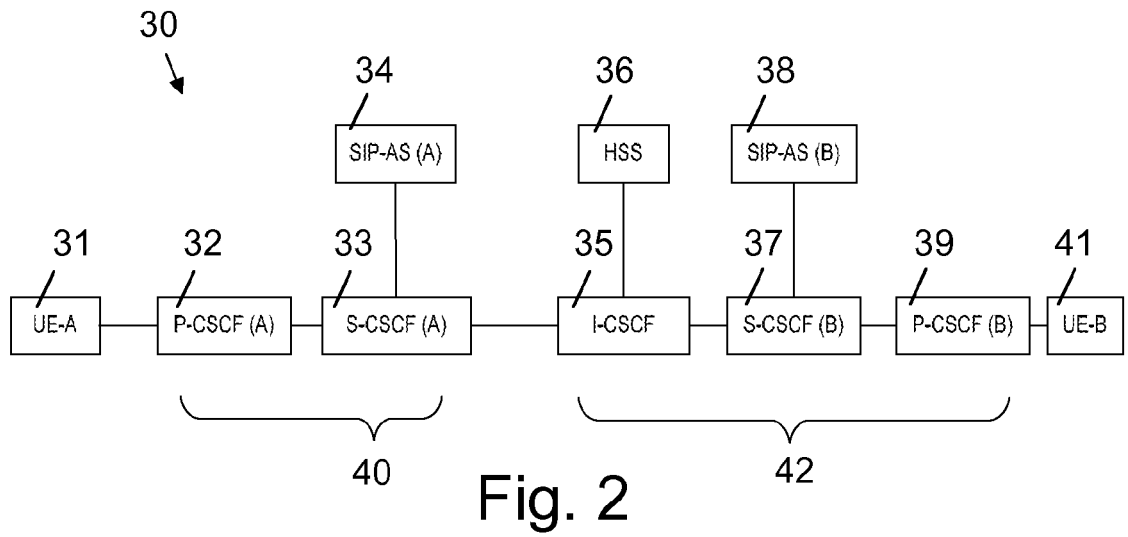
FIG. 2 is a schematic view of an IMS network architecture implementing an example of the improved method.

FIG. 2 is a schematic view of an example of an Internet protocol Multimedia Subsystem, IMS, signalling plane network architecture 30 for a call between a calling first party and a called second party implementing the improved method. The calling first party or UE-A is indicated with reference numeral 31 and the called second party or UE-B is indicated with reference numeral 41. A Proxy-Call Session Control Function, P-CSCF, server 32, 39 is a first server in the IMS network 30 to which a calling party or called party communicates. The P-CSCF 32, 39 serves as a signalling border between the (non-trusted) access network of the calling party 31 or called party 41 and the IMS network 30. It further protects the IMS network 30 from unwanted access of parties that are not allowed to access the IMS network 30. The calling party 31 discovers its associated P-CSCF 32 using DHCP or it may be configured in a static manner.

The IMS network 30 further comprises a subscriber registrar server 33, 37 which acts as a Subscriber-Call Session Control Function, S-CSCF. The subscriber registrar server 33, 37 is a central server in the signalling domain of the IMS network 30. It is arranged for, among many others, handling Session Initiation Protocol, SIP, registrations of parties 31, 41 which allow it to bind the user location of the parties 31, 41 and for deciding to which application server(s) SIP messages are forwarded to.

SIP Application Services servers 34, 38 are usually also present in an IMS network 30, which are utilized, among others, for execution of supplementary services for the call, such as Call Hold, Call Waiting, Call transfer etc. The Application Services server 34, 38 may monitor the call duration and apply call limit related to charging. The Application Services server 34, 38 may also allow or disallow a request for a change in the content domain, for example an upgrade from voice to voice and audio and charging of calls.

An Interrogating-Call Session Control Function, I-CSCF, server 35 is a server acting on the main name domain of the IMS network 30. It is arranged to query a Home Subscriber Server, HSS, 36 to retrieve the address of the subscriber registrar server, S-CSCF, 37 to which a called party 41 is registered to. It is also arranged to notify the HSS 36 to which subscriber registrar server, S-CSCF, 33, 37 the calling party 31 or the called party 41, respectively, is registered to.

Messages exchanged at the signalling plane of IMS, both requests and the responses, contain header fields. There are several headers fields, some being mandatory appearing in every message and others being optional header fields that only appear when needed. A node or server within an IMS network uses these header fields inside the SIP message, for example, for identifying the origin of the message. This is usually expressed by the From header field.

The combination of P-CSCF 32, subscriber registrar server, S-CSCF, 33 and the AS 34 associated with the calling party 31 is construed as the IMS network part 40 associated with the calling party 31. The combination of the P-CSCF 39, subscriber registrar server, S-CSCF, 37, AS 38, I-CSCF 35 and the HSS 36 is construed as the IMS network part 42 associated with the called party 41.

The improved method may be implemented in both the P-CSCF 32 and the AS 34 associated with the calling party 31 or in both the P-CSCF 39 and the AS 38 associated with the calling party 41.

Figure 3:
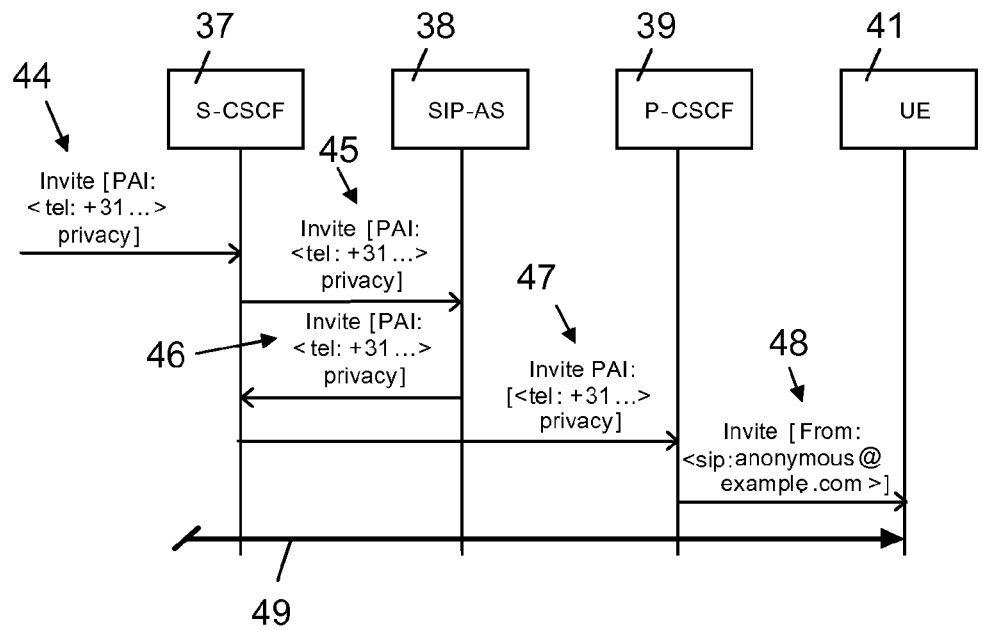
FIG. 3 is a schematic view a method of establishing a communication between a calling first party and a called second party in an IMS network, wherein the first party identity is withheld for the second party.

FIG. 3 is a schematic view of a method of establishing a communication between a first party and a second party in an IMS network 20 according to FIG. 2 not implementing the improved method, wherein the calling first party identity is withheld for the called second party.

When a communication is to be established from the calling first party UE-A 31, a SIP Invite from the UE-A 31 will arrive at the IMS network 30 and will be first handled by the IMS network part 40 associated with the calling party 31, as shown in FIG. 2.

When the calling or originating party is restricted, i.e. anonymous, for example due to unlisted directory number or due to Number restriction applied for this communication, the P-Asserted-Identity header field in a SIP Invite message can be used to convey the asserted identity of the originator of a request. Since the From header field in a SIP Invite is populated by the calling or originating UE it may not necessarily contain the actual or true identity in the telecommunication network. The identity usually is established by means of authentication between the calling or originating UE and its outgoing server. The outgoing server then adds a P-Asserted-Identity, PAI, header field to assert the identity of the originator to other servers.

Assume the Invite 44 of the calling or originating first party UE-A 31, FIG. 2, includes a privacy indication, for example Invite [PAI: <tel: +31 ... >privacy]. The usual processing of the Invite 44 may require accessing the SIP-AS 38, as indicated with reference numerals 45 and 46. The P-CSCF 39, receiving the Invite 47, makes anonymous the From header of the Invite 48 towards the called or receiving party UE-B 41, FIG. 3. For example by amending the user part of the URI carried in the From header, such as Invite [From: <sip: anonymous@example.com>].

When the UE of the called party 41 receives the call, the From header is used for number presentation. That is the UE display, as well as a call log, show anonymous. The domain part, i.e. example.com, of the From header is set by the P-CSCF, when making the From header anonymous, because of the PAI Privacy header. The domain part of an anonymous From header is normally not relevant to the end-user.

The established communication at the user plane of the IMS system is referred by reference numeral 49.

Instead of the P-CSCF 39, the S-CSCF 37 of the IMS network part 42 associated with the called party 41, may replace the From header in the Invite 47 by 'anonymous' or similar text.

Figure 4:
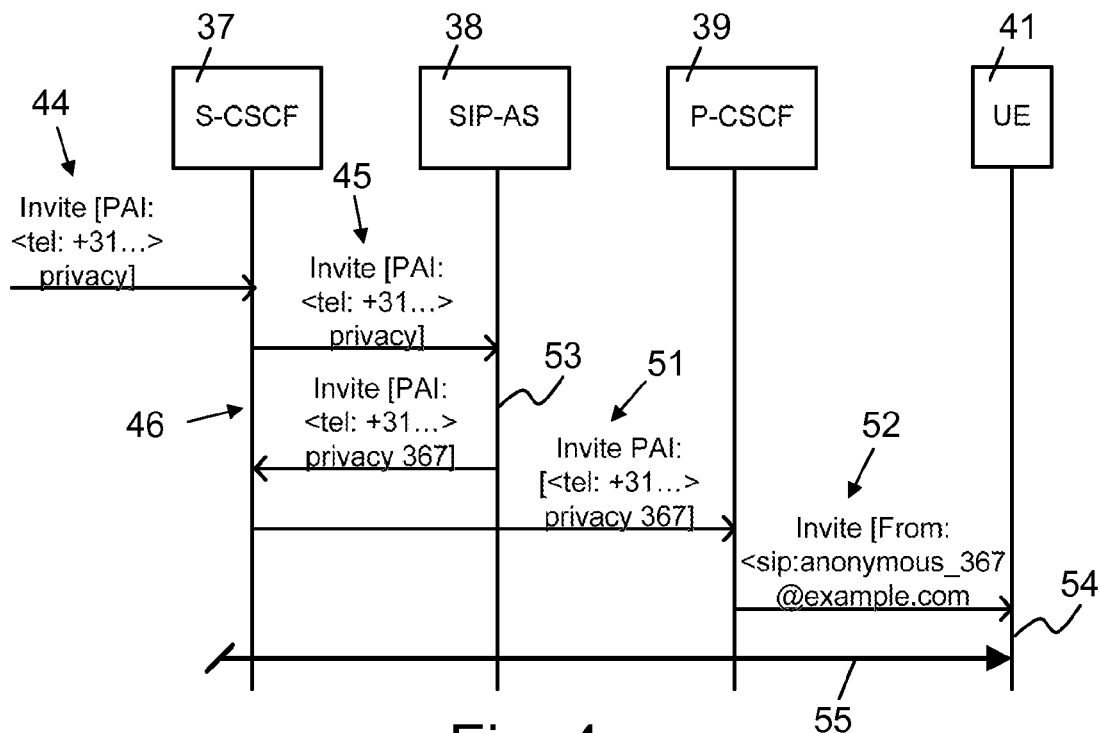
FIG. 4 is a schematic view illustrating an aspect of the improved method according to the present invention, wherein a communication is established between a calling first party and a called second party in an IMS network according to FIG. 2, wherein the first party identity is withheld for the second party.

FIG. 4 is a schematic view of an aspect of the improved method of establishing a communication between a first party and a second party in an IMS network 20 according to FIG. 2, wherein the calling first party identity is withheld for the called second party.

Different from the prior art call handling as disclosed with reference to FIG. 3, in the present example of the improved method, on receipt of an Invite 45 of the S-CSCF 37, the application server SIP-AS 38 of the IMS network part 42 associated with the called party 41 handling this call or message adds a token or correlation identifier to the privacy header of the Invite 50 according to an example of the improved method. For example Invite [PAI: <tel: +31 ... >privacy 367], wherein '367' represents a numerical token or correlation identifier unique for this communication. The number '367' may stand, for example, for the 367th anonymous communication in the telecommunication system. Alternatively, (unique) random numbers may be used as correlation identifier.

The P-CSCF 39 receives an Invite 51 of the S-SCSF 37 including the token or correlation identifier and sets the From header to 'anonymous' and adds the token or correlation identifier according to an example of the improved method to the From header of Invite 52 towards the called or receiving party UE-B. A suitable format of Invite 52 is, for example, [From: <sip: anonymous_367@example.com>]. The incoming call will appear with this indication, 'anonymous 367', at the display of the UE of the called party 41 and, if applicable in a call log at the UE of the called party, schematically indicated by reference numeral 54.

It is noted that instead of the P-CSCF 39, the S-CSCF 37 of the IMS network part 42 associated with the called party 41, may replace the From header in the Invite 47 by 'anonymous_367' or similar text.

The application server SIP-AS 38 places the calling party identity such as the telephone number of the calling party in the case of a telephone call or the sending subscriber in the case of a message, for example, as included in the PAI, in a call log of the telecommunication network, indicated by reference numeral 53. This call log or list may reside, for example, with the SIP-AS 38. The SIP-AS 38 adds the allocated token or correlation identifier in the call log as well, associated or assigned or coupled to the calling party identity. This call log list includes also information related to missed calls, enabling the called subscriber to return a missed call when the calling party was identified as 'anonymous' or 'restricted' or the like.

The established communication at the user plane of the IMS system is referred by reference numeral 55.

When the called party or subscriber UE-B 41 wants to return a call or send a message to this unlisted caller or message sender, i.e. likes to establish a further communication, it returns the call or message addressed to 'anonymous_367'. This call/message is, as per usual, handled by the application server SIP-AS 38. The SIP-AS 38 retrieves the previously stored calling party identity from its call log 53 and uses that to establish the call/send the message, without generating a new token or correlation identifier.

For this call case, the Request-URI, R-URI, is set to sip: anonymous_367@example.com, by the calling back terminal UE-B 41. This R-URI is transferred transparently to P-CSCF 39, S-CSCF 37 and SIP-AS 38. The subscriber is typically served by the same SIP-AS for originating calls sessions as for terminating calls/sessions. The SIP-AS 38 handling the originating call from UE-B 41 keeps a list of tokens or correlation identifiers, including the identifier 367. That is, the Request-URI R URI sip: anonymous_367@example.com matches one of the entries in this list 53, namely the entry that was created when the call from the anonymous caller UE-A 41 was received. That entry also contains the directory number of that UE (+31 . . . ). Hence, the SIP-AS 38 can retarget the SIP invite towards that directory number. The call can now be established.

Provisional response(s) and final response(s) for this call may contain the directory number of the called party, carried in the P-asserted-id header in the 200 Ok response or other responses. The SIP-AS 38 shall remove or make anonymous the PAI from/in the 200 Ok.

The SIP-AS 38 must also make sure that the anonymous number does not show in items of the Itemized Bill. Normally, an item contains information about a call including the called number. Within the context of the present improved method, several approaches may be used to show a call to an anonymous number in the itemized bill, for example:

the called number indicates "Anonymous" and the identifier as used in this call, for example anonymous_367@example.com. The user might memorize '367' as a certain calling/called party;

the itemized bill indicates "Anonymous", without including the suffix_367. Rationale of that approach would be that the user would in any case not be allowed to call back from the itemized bill.

Those skilled in the art will appreciate that, as an alternative to the above description, the application server SIP-AS 34 of the IMS network part 40 associated with the calling party 31 may add the token or correlation identifier to the Invite originating from the calling party UE-A 31, for example. The call log 53 may be accessible to, for example, to the application server SIP-AS 34 and the identity of the called party 41 may be associated or assigned or coupled with the called party identity. This, such that the calling part UE-A 31 likewise may set up a further communication to the called user 41 using the token correlation identifier.

The transfer of the token or correlation identifier in accordance with the improved method may also be transferred in a designated SIP header, for example.

The application server(s) 34, 38 when generating the token or correlation identifier may set and monitor validity time period for a particular token. Once expired, a token or correlation identifier is released from the log 53 and available for being assigned to another communication.

Privacy of the calling party shall be considered. Call back, or 'communications back' in general, may be possible under one or more of the following (not exhaustive) restrictions:

allowed only within 10 minutes after termination of the call;

allowed only when the call was terminated by the calling party;

allowed only when the called party could not answer the call (No Answer, Busy, Not Reachable).

When a subscriber receives a call or message from anonymous caller or sender and this call is placed in the (network based) call log in accordance with the improved method described above, then the subscriber may establish communication to that anonymous caller or sender. This communication does not necessarily have to take the form of a voice call. The communication could take the form of a voice call, a video call or a message or an e-mail or the like. Hereto, the called party's phone may offer the option to show a dropdown menu with possible communication possibilities, when selecting the anonymous caller from the call log. The application in the phone shall then establish the voice call/video call/message/e-mail to the anonymous call identity; the application server then applies the stored user identity for establishing the call or message to that anonymous caller/sender.

It shall be understood that, in a particular embodiment of the invention, the application server may restrict call back to anonymous caller to voice calls.

When the called party calls back to an anonymous caller, the called party himself/herself becomes calling party. The SIP application server handling this call to the anonymous caller may restrict the identity of this call-back calling party.

For example as a safety precaution, as it may not be desirable if the identity of the call-back calling party is revealed to the anonymous caller.

It shall be understood that for the purpose of the invention, hiding the identity of the call-back calling party, when calling back to the anonymous caller, is an option, not a necessity.

It may further be considered to have the SIP application server handling this call to the anonymous caller, apply a designated From header, to show the anonymous caller that this call is an anonymous call-back call. The From header may, for example, be set to sip:return_call@anonymous.net.

Whereas the intention is to provide the anonymous caller, who is receiving the anonymous call-back call some indication about the fact that this call is a anonymous call-back call, the identity in the From header should not be too obvious.

The method may also be used in combination with voicemail. When an anonymous caller leaves a voicemail, then the voicemail system will not pronounce the number of the person who left a voicemail. The voicemail system may, however, still offer the possibility to establish a call-back to that anonymous caller. The voicemail system would use the received calling party's restricted identity to establish the call, without revealing the anonymous caller's identity to the called party.

As proposed above, anonymous calls are identified by indicators like anonymous_367@example.com. Each incoming anonymous communication will get an other different unique token or correlation identifier, such as for example anonymous_367@example.com, anonymous_368@example.com, anonymous_369 @example.com, etc. as long as a previously used token or identifier is not released.

When several incoming calls are received from the same source, it would be beneficial to re-use the token or correlation identifier for all calls from that same source. The called party can then see that these calls originate from the same calling party.

When a calling party makes a call, normally the called number can give an indication on the tariff that will be applied to the call. For example, the called number can indicate that the call is a local call, long distance call, international call, premium-rate call. When a calling party makes a call to 'anonymous', there is no indication of the involved cost.

Therefore, it would be beneficial to include some cost indication in the identifier, e.g. 'anonymous_367_local' or 'anonymous_367_national'. It is, however, also appreciated that revealing a cost indication or distance indication provides some indication of the anonymous calling party, which may not be allowed. An operator may, for that reason, apply a fixed charge for calling back to an anonymous caller, e.g. national call rate, regardless of the location (local or long distance) of that anonymous party.

The service provided by the improved method is defined for usage in IMS network based communication, whereby subscribers may have a mix of SIP terminals, such as soft phones and desktop SIP phones, and non-SIP terminals, such as Global System for Mobile communications, GSM, phones.

When the called party, who is receiving a call from an anonymous caller, is subscribing to Connected Line Presentation, COLP, in GSM, or Terminating Identity Presentation, TIP, in IMS, then the identity of the anonymous caller would be returned to the called party, when that called party establishes a call-back call to the anonymous caller. Therefore, the SIP Application Server that is establishing the call-back call shall take care that the identity of the anonymous caller shall be restricted in the backwards communication towards the called party, when that called party establishes a call-back call.

For the call-back call, the anonymous caller becomes called party. Restricting the identity of the called party (or rather: connected party) can be done with standard GSM or IMS methodology.

In GSM, for example, User-to-User Signalling, UUS, may be used to convey the anonymous call identifier such as 'privacy 367'. However, by letting the SIP-AS set the calling party number to 9900367, for example, no UUS would be needed and the terminal would receive the A-party number as 9900367, without the need for terminal application. The called party then determines from the leading digits, **9900, that the number is restricted.

Figure 5:
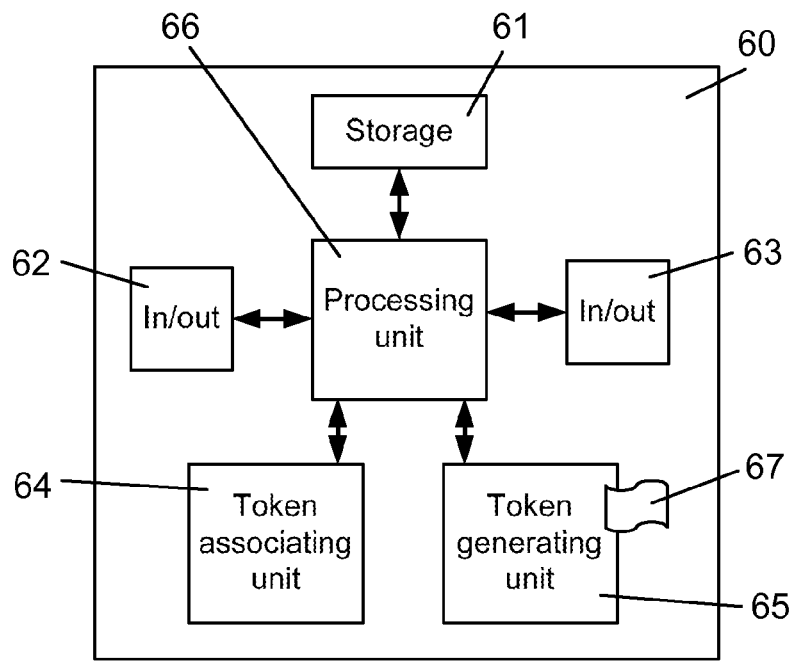
FIG. 5 is a schematic view of server for use in a telecommunication system according to an aspect of the present invention.

FIG. 5 is a schematic example of an application services server 60 for use in an IP communication network such as an IMS for implementing the improved method.

The application services server 60 comprises a storage 61, an IP network input and output unit I/O 62, 63 having an input and output for receiving and sending signalling messages, a token or correlation identifier generating unit 64 and a token or correlation identifier associating unit 65, all connected to a processing unit 66.

The token generating unit 64 is arranged for generating a token or correlation identifier 67 of a certain type, at least temporarily unique for a particular communication. By the associating unit 65 the token or correlation identifier 67 is associated or assigned or linked to one or both of the parties involved in the communication. Information at least comprising the calling party identity, such as found within the From header of a SIP message, is therefore bound to the token 67.

In a further call or communication the token or correlation identifier 67 can be used to translate the From header within the SIP message back to the originally stored calling party identity, such as his or her SIP address. The AS server 60 thereby provides the telecommunication system with the improved method and service of calling back an anonymous party based on the token.

It will be appreciated by those skilled in the art that the functionality disclosed in relation to the improved method, server and communication system may be applied in special hardware, software, or a combination thereof.

The invention is not limited to the embodiments described, but can be practised with modifications and alterations within the scope of the appended claims.

The invention claimed is:

1. A method in a telecommunication system of establishing communication from a first party having a first party identity to a second party having a second party identity, wherein said first party identity is withheld from said second party, said method comprising:
generating a token unique for a first communication, in said telecommunication system, between the first and second parties, in response to establishment of said first communication;
associating said token with said first party identity for establishing a further communication in said telecommunication system between said first party and said second party based on said token; and
in response to initiation by the second party of a further communication in said telecommunication system between said first party and said second party, providing to said second party, based on said token, tariff information for said further communication before same is established.

2. The method of claim 1, wherein said token relates to one of a group of tariff ranges relating to charging of said further communication.

3. The method of claim 1, wherein said tariff information is calculated based on said first party identity.

4. The method of claim 1, wherein said tariff information is calculated based on both said first and second party identity.

5. The method of claim 1, wherein said tariff information is provided when said token is selected for setting up said further communication.

6. The method of claim 1, wherein said tariff information is provided with said token in a call log.

7. The method of claim 1, wherein said tariff information is displayed at a display of a user equipment.

8. The method of claim 1, wherein said associating comprises associating said token with said first party identity and said second party identity.

9. The method of claim 1, wherein said token is temporarily associated.

10. The method of claim 1, wherein said further communication comprises establishing communication from said second party to said first party addressed by said token, wherein said second party identity is withheld from said first party.

11. The method of claim 1, wherein the method further comprises logging said communication and said token in one or both of a call log available to said second party and a call log available to said first party, wherein said further communication is established from said call log.

12. The method of claim 11, wherein the method further comprises deleting said call log if said association of said token is released.

13. The method of claim 1, wherein said communication and said further communication each comprise one or more of the group consisting of a telephone communication, an email communication, a video communication and a text communication.

14. An application services server arranged for operating in an Internet protocol Multimedia Subsystem (IMS) telecommunication system and further arranged for establishing a first communication from a first party having a first party identity to a second party having a second party identity, wherein said first party identity is withheld from said second party, said server comprising:
a token generating unit configured to generate a token unique for said first communication between the first and second parties, in response to establishment of said first communication; and
a token associating unit configured to associate said token with said first party identity or with both said first party identity and said second party identity, for establishing a further communication initiated by said second party in said telecommunication system between said first party and said second party, based on said token;
wherein said server is further arranged to provide to the second party, based on said token, tariff information of said further communication before same is established.

* * * * *

UNITED STATES PATENT AND TRADEMARK OFFICE
CERTIFICATE OF CORRECTION

PATENT NO.        : 9,020,113 B2
APPLICATION NO.   : 14/112120
DATED             : April 28, 2015
INVENTOR(S)       : Noldus et al.

It is certified that error appears in the above-identified patent and that said Letters Patent is hereby corrected as shown below:

In the specification

In Column 11, Line 22, delete "IMS network 20" and insert -- IMS network 30 --, therefor.

In Column 12, Line 18, delete "S-SCSF 37" and insert -- S-CSCF 37 --, therefor.

In Column 13, Line 1, delete "UE-A 41" and insert -- UE-A 31 --, therefor.

In Column 15, Line 27, delete "generating unit 64" and insert -- generating unit 65 --, therefor.

In Column 15, Line 28, delete "associating unit 65," and insert -- associating unit 64, --, therefor.

In Column 15, Line 30, delete "generating unit 64" and insert -- generating unit 65 --, therefor.

In Column 15, Line 33, delete "associating unit 65" and insert -- associating unit 64 --, therefor.

Signed and Sealed this
Fourteenth Day of June, 2016

Michelle K. Lee
*Director of the United States Patent and Trademark Office*